(12) United States Patent
Jin

(10) Patent No.: US 9,041,585 B2
(45) Date of Patent: May 26, 2015

(54) SAR AUTOFOCUS FOR GROUND PENETRATION RADAR

(75) Inventor: Michael Y. Jin, Arcadia, CA (US)

(73) Assignee: RAYTHEON COMPANY, Waltham, MA (US)

( * ) Notice: Subject to any disclaimer, the term of this patent is extended or adjusted under 35 U.S.C. 154(b) by 475 days.

(21) Appl. No.: 13/347,548

(22) Filed: Jan. 10, 2012

(65) Prior Publication Data

US 2014/0015710 A1   Jan. 16, 2014

(51) Int. Cl.
*G01S 13/90* (2006.01)
*G01S 13/88* (2006.01)

(52) U.S. Cl.
CPC ........... *G01S 13/9035* (2013.01); *G01S 13/885* (2013.01); *G01S 13/90* (2013.01)

(58) Field of Classification Search
CPC .. G01S 13/90; G01S 13/9011; G01S 13/9035
USPC ......................................... 342/22, 25 R–25 F
See application file for complete search history.

(56) References Cited

U.S. PATENT DOCUMENTS

| | | | |
|---|---|---|---|
| 5,937,102 A | 8/1999 | Jin | |
| 6,037,892 A | 3/2000 | Nikias et al. | |
| 6,046,695 A * | 4/2000 | Poehler et al. | 342/25 A |
| 6,492,932 B1 | 12/2002 | Jin et al. | |
| 6,738,009 B1 * | 5/2004 | Tsunoda | 342/25 A |
| 6,781,541 B1 * | 8/2004 | Cho | 342/25 D |
| 7,145,496 B2 * | 12/2006 | Cho et al. | 342/25 R |
| 7,551,119 B1 * | 6/2009 | Doerry | 342/25 R |
| 7,663,529 B2 * | 2/2010 | Connell et al. | 342/25 F |
| 7,843,377 B2 * | 11/2010 | Connell et al. | 342/25 F |
| 2008/0042893 A1 * | 2/2008 | Connell et al. | 342/25 F |
| 2010/0149024 A1 * | 6/2010 | Connell et al. | 342/25 F |
| 2011/0133983 A1 * | 6/2011 | Connell et al. | 342/25 F |
| 2011/0285580 A1 * | 11/2011 | Bosser et al. | 342/25 F |

OTHER PUBLICATIONS

Fienup, et al., "Aberration Correction by Maximizing Generalized Sharpness Metrics," Journal of the Optical Society of America, vol. 20, No. 4, Apr. 2003 (pp. 609-620).
Muller, et al., "Real-time Correction of Atmospherically Degraded Telescope Images Through Image Sharpening," Journal of the Optical Society of America, vol. 64, No. 9, Sep. 1974 (pp. 1200-1210).

(Continued)

*Primary Examiner* — John B Sotomayor
*Assistant Examiner* — Marcus Windrich
(74) *Attorney, Agent, or Firm* — Christie, Parker & Hale, LLP

(57) ABSTRACT

A method of synthetic aperture radar autofocus for ground penetration radar. The method includes transmitting a signal via an antenna; receiving a reflected signal comprising a plurality of image blocks via the antenna; reading each image block from the reflected signal via a processor; locating prominent targets in each image block via the processor; estimating ground penetration phase error via the processor in each image block via phase error inputs including pulling range and quantization level by generating a 1D phase error and converting the 1D phase error into a 2D phase error of an image spectra; refocusing each image block according to estimated ground penetration phase error for that image block via the processor; and forming an image mosaic comprising each refocused image block via the processor.

4 Claims, 21 Drawing Sheets
(14 of 21 Drawing Sheet(s) Filed in Color)

(56) References Cited

OTHER PUBLICATIONS

Chan, et al., "Noniterative Quality Phase-Gradient Autofocus (QPGA) Algorithm for Spotlight SAR Imagery", IEEE Transactions on Geoscience and Remote Sensing, IEEE Service Center, Piscataway, NJ, US, vol. 36, No. 5, Sep. 1, 1998 (pp. 1531-1539).
Koo, et al., "A Comparison of Autofocus Algorithms for SAR Imagery", Progress in Electromagnetics Research Symposium 2005, Hangzhou, China, Aug. 22-26 (pp. 16-19).
Zhu, et al., "SAS Autofocus Based on Phase Gradient Autofocus", 2011 Fourth International Workshop on Chaos-Fractals Theories and Applications (IWCFTA), IEEE, Oct. 19, 2011 (pp. 298-301).
Written Opinion of the International Searching Authority for International Application No. PCT/US2012/064527, filed Nov. 9, 2012, Written Opinion of the International Searching Authority mailed Jul. 15, 2013 (8 pgs.).
International Search Report for International Application No. PCT/US2012/064527, filed Nov. 9, 2012, International Search Report dated Jul. 3, 2012 and mailed Jul. 15, 2013 (4 pgs.).
International Preliminary Report on Patentability from corresponding international Application No. PCT/US2012/064527, International Preliminary Report on Patentability dated Jul. 15, 2014 and mailed Jul. 24, 2014 (10 pgs.).

* cited by examiner

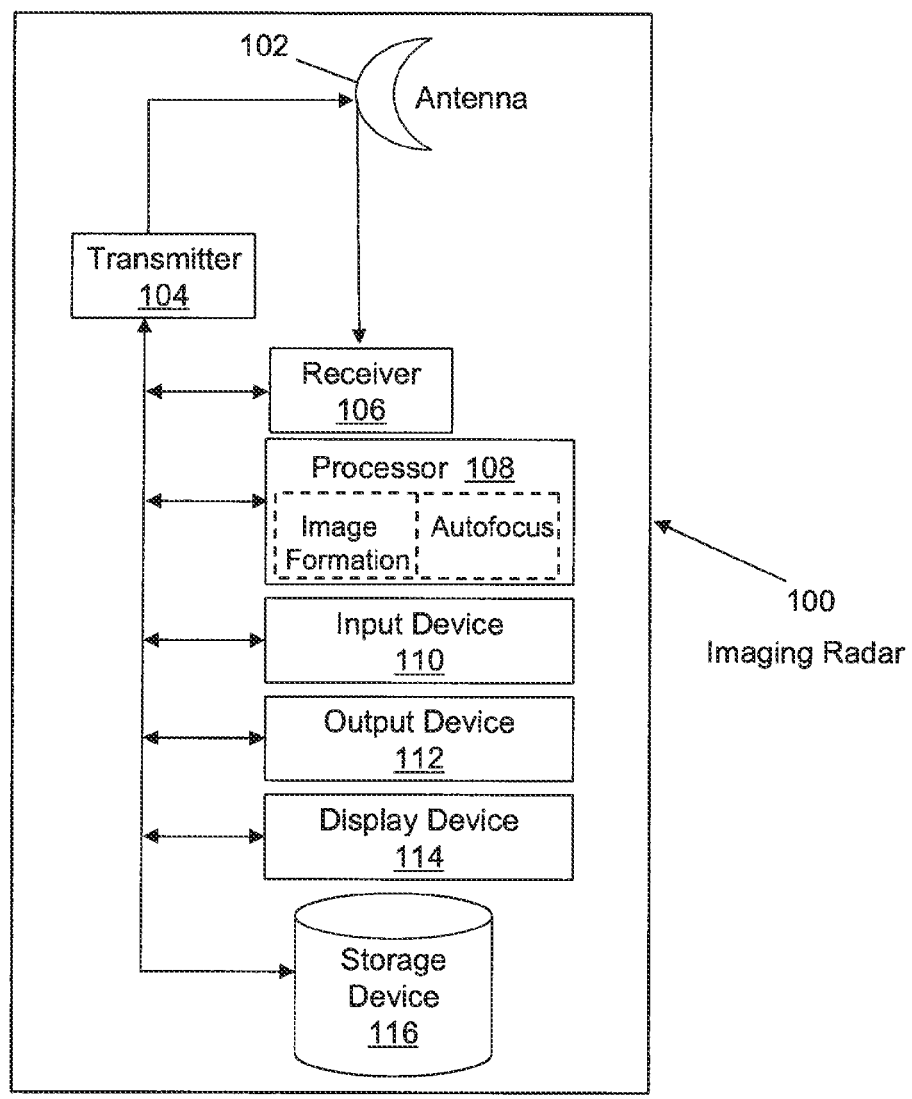

FIG. 20a
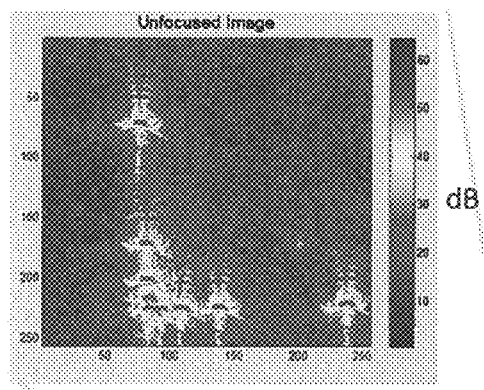
FIG. 20c
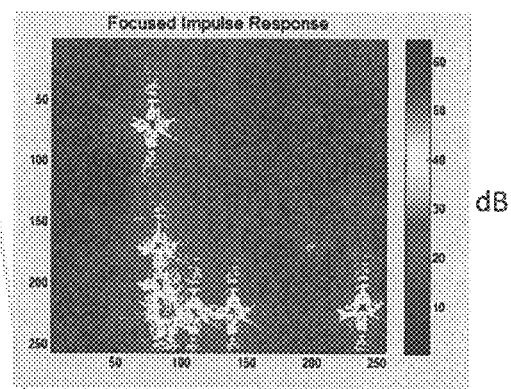
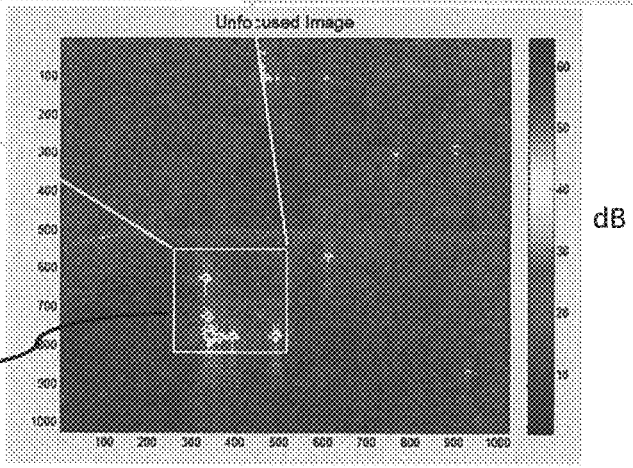
FIG. 20b

SAR AUTOFOCUS FOR GROUND PENETRATION RADAR

STATEMENT REGARDING FEDERALLY SPONSORED RESEARCH OR DEVELOPMENT

This invention is related to U.S. Government contract number H94003-04D-0006 Task Order 0185 (Hawkeye (Ground Penetrating Synthetic Aperture Radar (GPSAR)) Vertical Take Off and Landing). The U.S. Government has certain rights in this invention.

BACKGROUND

1. Field

The present invention is related to autofocus for ground penetration radar ("GPR"), and more particularly to, autofocus for wide-beam/wide-band GPR.

2. Description of Related Art

Synthetic aperture radar ("SAR") is used for ground mapping as well as target identification, where a moving platform, e.g., an aircraft, has an imaging radar that sends transmitted signals from different positions along the path of the platform such that the ground (e.g., ground clutter) reflects signals that are received by the imaging radar.

To achieve high azimuth resolution in SAR image formation, the slant range history of the processed target must be highly accurate. However, high azimuth resolution is not achieved for most SAR systems, since a costly high performance navigation system would be required, as well as accurate knowledge of the terrain elevation. One viable solution is to include an autofocus process during or after SAR processing for improving the image quality.

However, though there are some autofocus solutions for various narrow band and narrow beam SAR systems, the autofocus solution for GPR remains a challenging problem due to several factors. First, the autofocus solution is highly spatially varying within the image frame. For a narrow beam SAR, one autofocus solution is mostly applicable to the entire image. But, for a wide beam SAR, one autofocus solution may only be applicable to a small image block. This is because the phase error caused by the navigation error is angle dependent, as illustrated in FIGS. 2 and 3.

As show in FIG. 2, the distance from the target 200 to the actual aircraft path 202 may deviate from the knowledge aircraft path 204 by a range error 206.

As shown in FIG. 3, dRA=R'A−RA,
dRB=R'B−RB,
dRA≠dRB, where dRA is the difference between the distance from the radar actual position 30 to target A and the distance from the radar knowledge position to target A, and where dRB is the difference between the distance from the radar actual position 30 to target B and the distance from the radar knowledge position to target B. Here, dRA and dRB are not equal.

Second, the target range migration trace of a wide beam SAR is highly curved due to the wide synthetic aperture angle. In range compressed data, it is difficult to extract a target signal directly or after a simple data deskew process. Therefore, identifying prominent targets or estimating phase error cannot be efficiently performed in the range compressed data set.

Third, the strength of the prominent targets in GPR is usually not as high as other high frequency SAR. This leads to the need for highly sensitive phase error estimation algorithms, such as maximum likelihood estimation or contrast optimization.

All these factors indicate the need for an effective GPR autofocus method.

SUMMARY

Embodiments of the present invention are related to an autofocus method for wide-beam/wide-band GPR. This method estimates target phase error directly from a complex ground image of high contrast targets. A focused image is then obtained by removing the estimated phase error from the spatial frequency spectra of the complex image. The phase error of the imaged targets is modeled by the superposition of a one-dimensional (1D) Fourier series of limited order. Each component of the phase error is estimated from the two-dimensional spatial (ground) frequency spectra through 2D to 1D mapping. Optimal phase error is obtained by means of a contrast optimization method.

An embodiment of the present invention provides a method of synthetic aperture radar autofocus for ground penetration radar. The method includes transmitting a signal via an antenna; receiving a reflected signal comprising a plurality of image blocks via the antenna; reading each image block from the reflected signal via a processor; locating prominent targets in each image block via the processor; estimating ground penetration phase error via the processor in each image block via phase error inputs including pulling range and quantization level by generating a 1D phase error and converting the 1D phase error into a 2D phase error of an image spectra; refocusing each image block according to estimated ground penetration phase error for that image block via the processor; and forming an image mosaic comprising each refocused image block via the processor.

The estimating ground penetration phase error may further include: assigning an order of base functions via the processor; assigning a phase error magnitude via the processor; generating the 1D phase error from the assigned phase error magnitude and the base function via the processor; generating a 2D image spectra via a 2D fast fourier transform of each image block via the processor; mixing the 2D phase error over the 2D image spectra via the processor; performing an inverse 2D fast fourier transform over the phase error mixed spectra to determine an image domain via the processor; determining phase error among multiple phase error magnitudes and multiple image blocks based on maximum image contrast; determining a total phase error based on phase error components via the processor; and removing the total phase error from the image spectra via the processor.

Another embodiment of the present invention provides a system for synthetic aperture radar autofocus for ground penetration radar. The system includes: an antenna for transmitting a signal and for receiving a reflected signal comprising a plurality of image blocks, and a processor. The processor is programmed to: read each image block from the reflected signal; locate prominent targets in each image block; estimate ground penetration phase error in each image block via phase error inputs including pulling range and quantization level by generating a 1D phase error and converting the 1D phase error into a 2D phase error of an image spectra; refocus each image block according to estimated ground penetration phase error for that image block; and form an image mosaic comprising each refocused image block.

The processor may further be programmed to estimate ground penetration phase error further by: assigning an order of base functions; assigning a phase error magnitude; generating the 1D phase error from the assigned phase error magnitude and the base function; generating a 2D image spectra via a 2D fast fourier transform of each image block; mixing the 2D phase error over the 2D image spectra; performing an inverse 2D fast fourier transform over the phase error mixed spectra to determine an image domain; determining phase error among multiple phase error magnitudes and multiple image blocks based on maximum image contrast; determining a total phase error based on phase error components; and removing the total phase error from the image spectra.

BRIEF DESCRIPTION OF THE DRAWINGS

The patent or application file contains at least one color drawing executed in color. Copies of this patent or patent application with color drawing(s) will be provided by the Office upon request and payment of the necessary fee.

FIG. 1B is a schematic view of the SAR of FIG. 1A.

FIG. 20a shows an unfocused GPR image with corner reflectors, where the system has a wide frequency band from 1.0 GHz to 1.8 GHz.

FIG. 20b shows an enlarged area I of FIG. 20a.

FIG. 20c shows an example of a focused impulse response of the image of FIG. 20a according to an embodiment of the present invention.

DETAILED DESCRIPTION

An embodiment of the present invention provides a method for autofocus for wide-beam/wide-band ground penetration radar (GPR), where the wide beam angle makes the phase error highly spatially varying. This method estimates target phase error directly from the complex ground image of high contrast targets. A focused image is then obtained by removing the estimated phase error from the spatial frequency spectra of the complex image. The phase error of the imaged targets is modeled by the superposition of a one-dimensional Fourier series of limited order. Each component of the phase error is estimated from the two-dimensional spatial (ground) frequency spectra through 2D to 1D mapping. Optimal phase error is obtained by means of a contrast optimization method.

Embodiments of this method overcome some of the challenges of GPR autofocus. First, to overcome spatially varying phase error, the GPR image is divided into multiple image blocks in order for each image block to be refocused by a single phase profile. A phase error estimate is independently applied to each image block. An optional trending analysis may be applied to all estimated phase error functions for further improvement before phase error is finally applied to refocus the image.

Embodiments of this method are suitable for ground penetration radar for detecting natural resources and for medical tomography image processing.

Figure 1A:
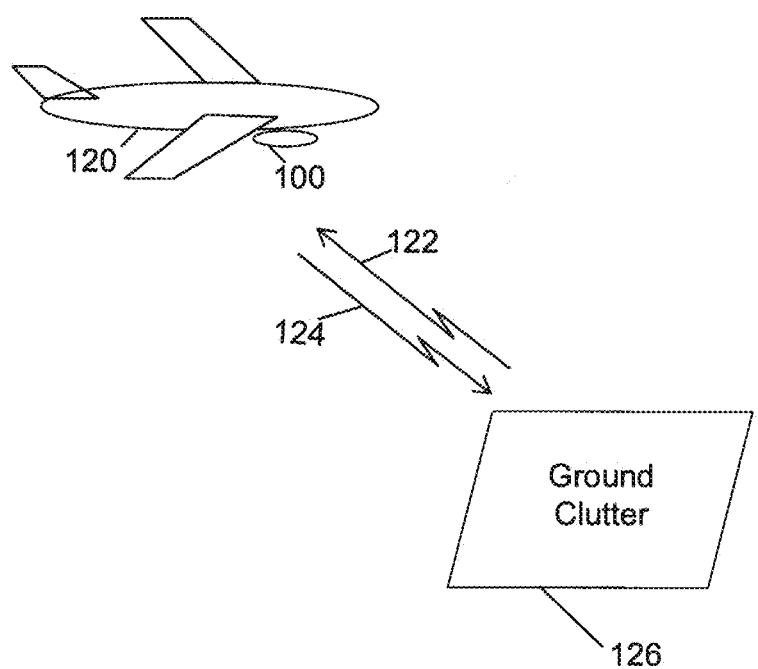
FIG. 1A is a schematic view of an aircraft with an SAR according to an embodiment of the present invention.
Figure 2:
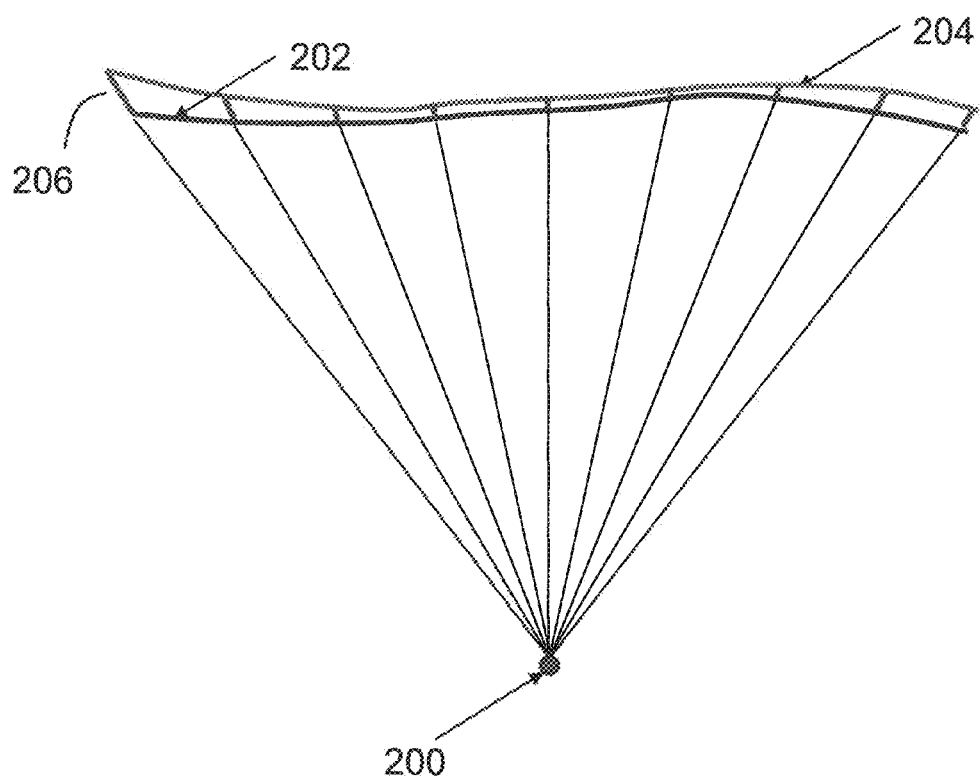
FIG. 2 is a schematic view of a source of range error.
Figure 3:
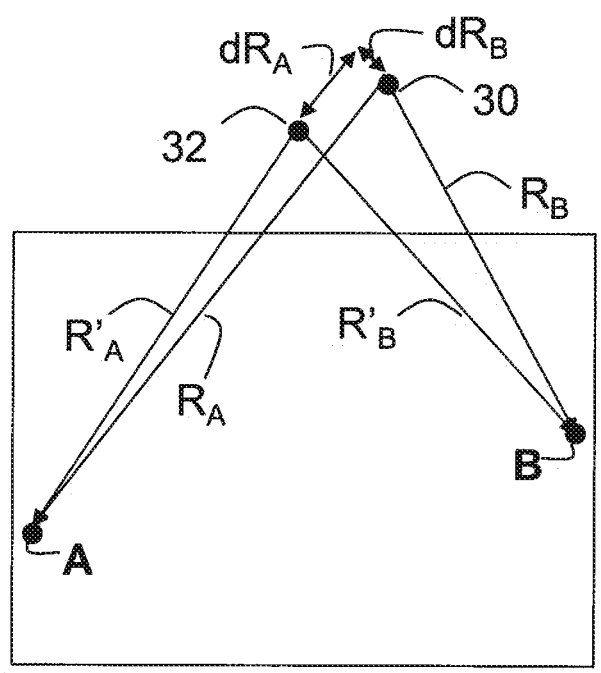
FIG. 3 is a schematic view of an angle dependent range error.

According to an embodiment of the present invention, a moving platform 120 (e.g., an airplane) has an imaging radar, shown in FIG. 1A, that sends a transmitted signal 124 such that the ground 126 (e.g., ground clutter) reflects a reflected signal 122 that is received by the imaging radar 101. As show in FIG. 1B, the imaging radar 100 includes an antenna 102 that receives a signal from a transmitter 104 for transmission as a transmitted signal 124 and that receives the reflect signal 122 for a receiver 106. A processor 108 performs an autofocus method according to an embodiment of the present invention.

A text or graphical terminal input device 110 allows the user to enter or key in the processing parameters for both image formation and autofocus. An output device 112 outputs or prints the processing log and intermediate parameters as feedback to the user. An image display device 114, such as a monitor, allows the user to examine the SAR image and the phase error plots. All processed images, estimated phase error data, processing log files may also stored in a storage device 116.

The highly curved target range migration trace prevents the efficient use of the range compressed data for autofocus. Therefore, embodiments of the present invention perform a phase error estimate from the 2D spectra of the complex ground image, which show that there is a simple relationship between the one-dimensional slant range error and the two-dimensional phase error spreading over a fan shaped area in the spatial frequency domain. In this mapping, the synthetic aperture time is related to the polar angle of the spectra. The slant range error is related to a 2D phase error according to the wave number or the spatial frequency in the radial direction of the spectra.

To overcome the lower signal-to-noise ratio of a GPR target, a preferred solution for phase error estimation is taken, i.e. image contrast optimization. In addition, a target screening process is employed to allow the most useful point-like target be selected for phase error estimation.

One can express the phase error $\Delta\phi(t)$ in terms of base function expansion, $$\Delta\varphi(t) = \sum_{i=1}^{I} a_i L_i(t)$$

where $L_i(t)$ is the base function and $a_i$ is the associated coefficient. Here, there may be many choices of base functions. One example is the Legendre orthogonal polynomial, as described in U.S. Pat. No. 7,145,496 to Cho et al. This base function is favored due to the fact that a common phase error term is a quadratic one. However, since the linear term does not introduce any focusing artifact, it must be excluded from the base function. In addition, the Legendre orthogonal polynomial is more complicated when it involves the high order terms. Our proposed base function for the phase error model is the Fourier series with $\cos(2\pi i t)$ and $\sin(2\pi i t)$ terms in the following form:

$$\Delta\varphi(t) = \sum_{i=1}^{I} (a_i \cos(2\pi it) + b_i \sin(2\pi it))$$

The advantage of this base function is that there is a simple mapping between each sidelobe location and each pair of $\cos(2\pi i t)$ and $\sin(2\pi i t)$ base function. The value of $a_i$ and $b_i$ are bounded by two input parameter. These are the pulling range, $\phi_{max}$, or the error bound, and the quantization level $\Delta\phi$. The number of phases compared in this system is an integer ceil($\phi_{max}/\Delta\phi$), and the computation load is proportional to ceil($\phi_{max}/\Delta\phi$). One way to reduce computation load is by using a multiple stage of phase comparison scheme, which involves a coarse phase quantization in the initial stage and a fine quantization in the subsequent stages.

The focus degradation of a target in GPR originates from the error in the estimate of the target delay time $\Delta\tau(t)$, where $$\Delta\tau(t) = \frac{2}{c}\Delta R(t)$$

and $\Delta R(t)$ is the range error between the actual slant range and the knowledge slant range derived from the navigation data. The associated phase error of $\Delta\tau(t)$ with respect to the center frequency of the radar pulse is given by $$\Delta\varphi_c(t) = -\frac{4\pi}{\lambda_c}\Delta R(t)$$

The phase error viewed in the ground spatial frequency domain is give by $$\Delta\varphi(k_{rg}, \theta_{polar}(t)) = -2\pi k_{rg}\Delta R(t) = -4\pi\frac{\cos\theta_{gz}(t)}{\lambda}\Delta R(t)$$

where $k_{rg} = \cos\theta_{gz}(t) \cdot k_r$ and $$k_r = \frac{2}{\lambda}.$$

The polar angle in spatial frequency coordinate is related to the ground azimuth angle of the target, i.e. $\theta_{polar}(t) = \pi - \theta_{az}(t)$.

Both the ground azimuth angle and the grazing angle are given by $\theta_{az}(t) = \tan^{-1}((\vec{r}_T(t) - \vec{r}_{ac}(t)) \cdot \hat{C}, \ (\vec{r}_T(t) - \vec{r}_{ac}(t)) \cdot \vec{v}_{ac}(t_0))$ where $\hat{C}$ is the cross-track unit vector. Further, $$\theta_{gz}(t) = \sin^{-1}\left(\frac{-(\vec{r}_T(t) - \vec{r}_{ac}(t)) \cdot \hat{d}}{\|\vec{r}_T(t) - \vec{r}_{ac}(t)\|}\right)$$

where $\hat{d}$ is the unit vector of the down-track.

The along-track unit vector is given by $\hat{a} = \vec{v}_{ac}(t_0)/\|\vec{v}_{ac}(t_0)\|$ and $\hat{d} = \hat{a} \times \hat{C}$.

Figure 4:
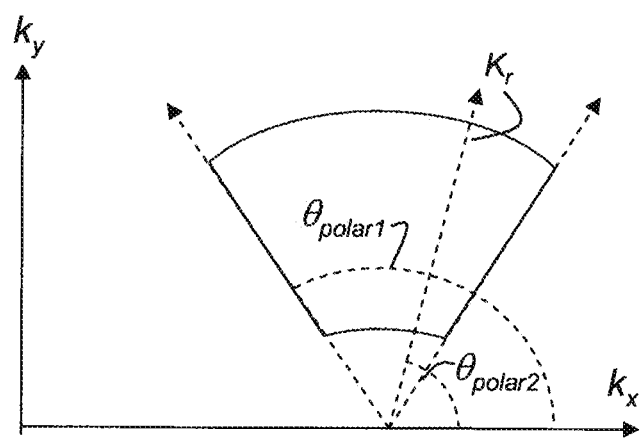
FIG. 4 is a schematic view of spectra of a complex GPR image.
Figure 5:
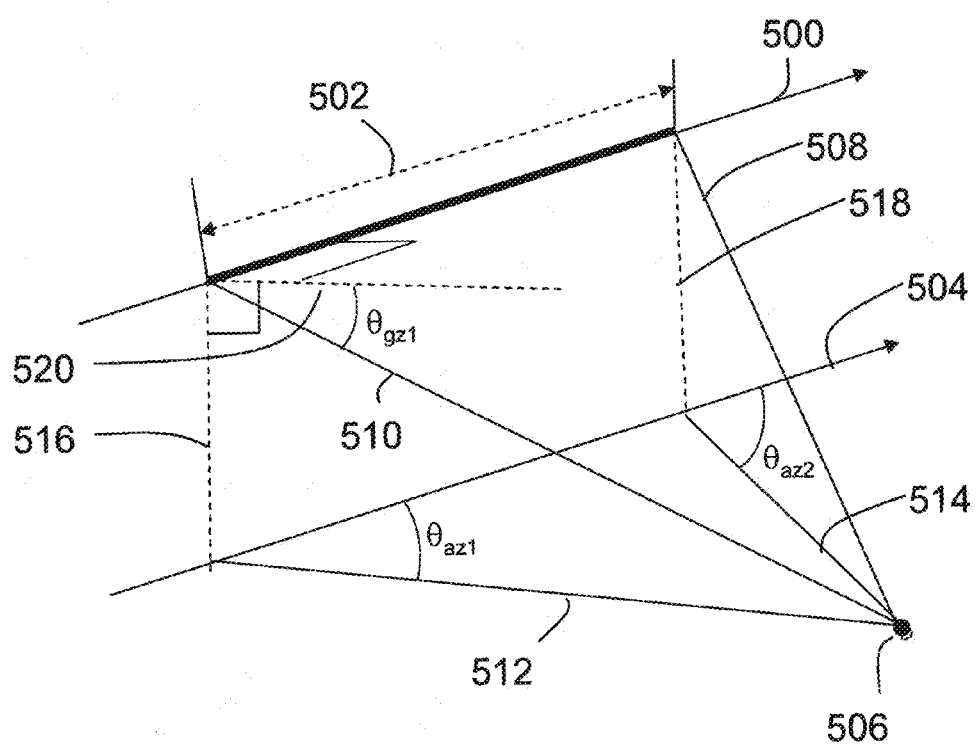
FIG. 5 is a schematic view of mapping geometry of a GPR.

The polar angle of the target, at time t, is given by $\theta_{polar}(t) = \pi - \theta_{az}(t)$. The complex image spectra and the mapping geometry are illustrated in FIGS. 4 and 5.

The image quality can be described by the impulse response in terms of 3 dB resolution and sidelobe level. In an SAR system where residual phase error exists, the peak of the impulse response drops, the 3 dB width increases, and the sidelobe level is raised. All these impulse response performance factors lead to the reduction of image sharpness and contrast. A conventional contrast measure is in the form of $$\sum_i A_i^4 \bigg/ \left(\sum_i A_i^2\right)^2$$

which is referred to as the 5th metric by Muller and Buffington in the September 1974 article in the JOURNAL OF THE OPTICAL SOCIETY OF AMERICA, Vol. 64, No. 9, entitled, "Real-time correction of atmospherically degraded telescope images through image sharpening," the entire content of which is incorporated herein by reference. This is a highly nonlinear measure. It assigns a much larger weight to a brighter target. This has the effect of making medium and low intensity targets, nearby the brighter target, unable to influence the final phase error estimate. Further, a contrast metric may be formulated such that targets falling into a certain intensity range dominate the final contrast measures, as described by J. R. Fienup and J. J. Miller in the April 2003 article in the JOURNAL OF THE OPTICAL SOCIETY OF AMERICA, Vol. 20, No. 4, entitled, "Aberration correction by maximizing generalized sharpness metrics," the entire content of which is incorporated herein by reference. Therefore, one may perform autofocus based on various targets such as prominent point targets, a complicated urban target, or a vegetation area.

The problem with the conventional contrast metric design is that there is only one contrast metric for each scene. This can be avoided by using the concept of local contrast, which is the contrast measure of small image patches or segments of image lines. The idea of local contrast has been carefully studied and found to be practical.

Figure 6:
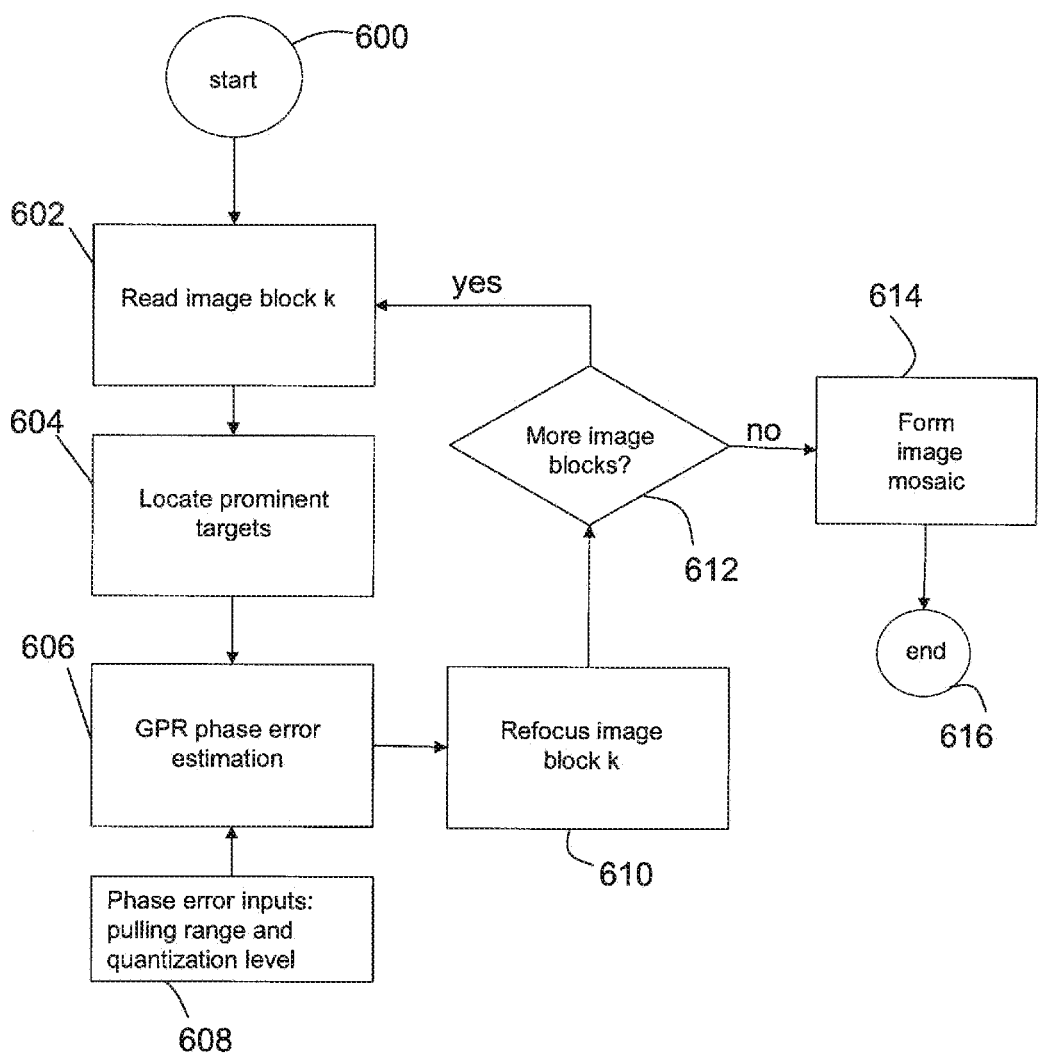
FIG. 6 is a flow chart showing a method of autofocus data flow according to an embodiment of the present invention.

The high level autofocus method is illustrated in FIG. 6. Since the phase error of a GPR system is spatially varying, refocusing a large GPR image may be performed in a loop with each small image block focused independently. The method begins by reading an individual image block k 602. To estimate the phase error of each image block with maximum efficiency, the prominent target must be identified 604. The prominent target should have sharp features in the azimuth dimension with good signal to background noise ratio. Next, the GPR phase error estimation is performed 606. Here, phase error inputs are pulling range and quantization level 608.

Then, refocusing of image block k is performed. Next, it is determined whether there are more image blocks to be read 612. After all image blocks are refocused, a final image is formed as the mosaic of the refocused image blocks 614.

Figure 7:
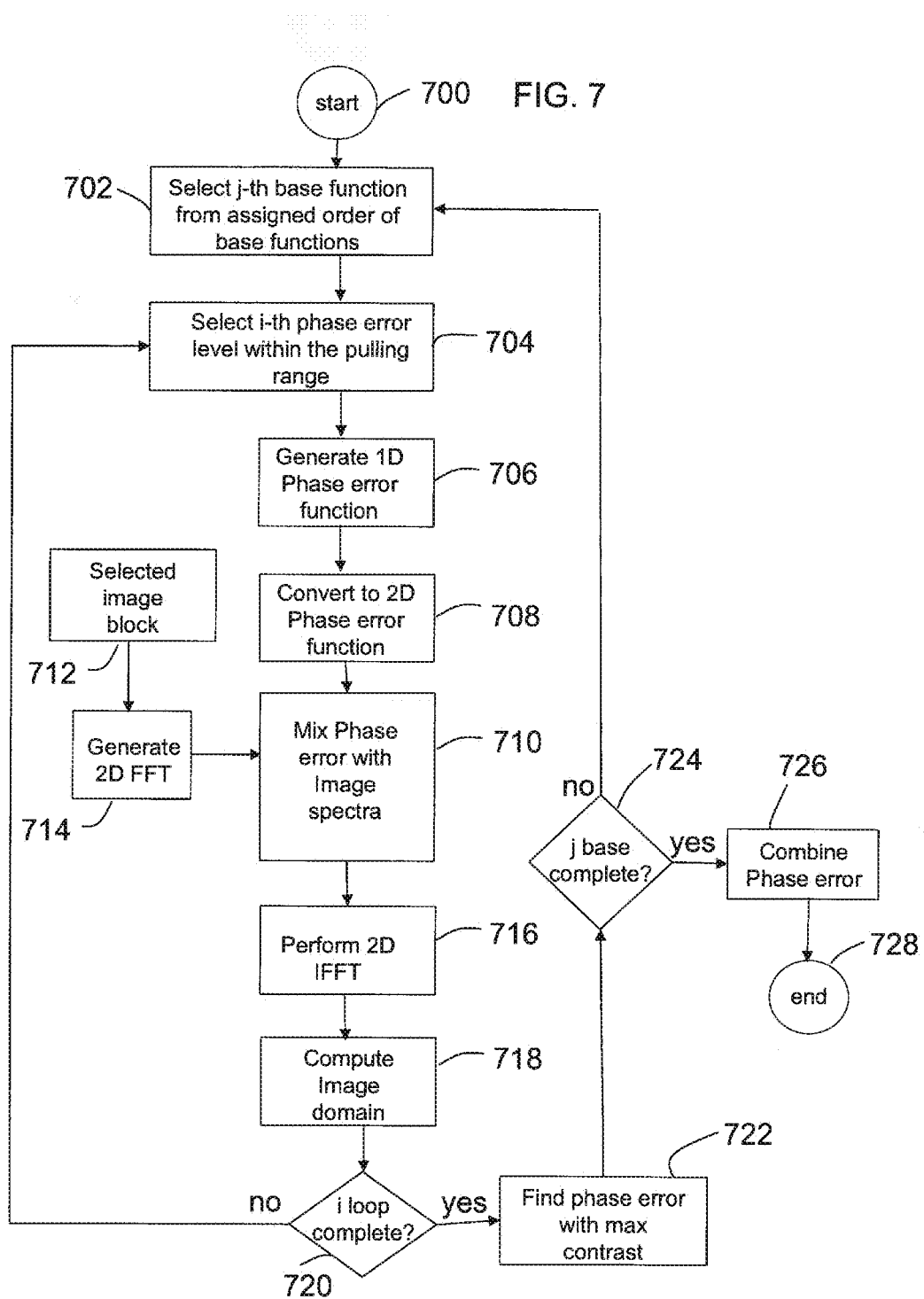
FIG. 7 is a flow chart showing a method of GPR phase error estimation data flow according to an embodiment of the present invention.

The core autofocus process using the contrast optimization consists of two "do" loops. The first one is the loop over all orders of Fourier series of interest. The second is the loop over all levels of phase error magnitude within the pulling range. Details of the process of steps 606 and 607 are illustrated in the data flow diagram in FIG. 7.

This process consists of the following steps: assigning the order of the base function 702; assigning the phase error magnitude 704; generating the 1D phase error from the assigned phase error magnitude and the base function 706; converting the 1D phase error into a 2D phase error of the image spectra 708; generating a 2D image spectra by a 2D FFT 714 over the selected image block 712; mixing the 2D phase error over the 2D image spectra 710; and performing inverse 2D FFT 716 over the phase error mixed spectra to get back to the image domain 718. At the end of phase error magnitude loop 720, the matched magnitude with the maximum contrast is identified 722. At the end of the base function loop 724, all phase error components for the final phase error are added 726. Once the final phase error is estimated, the final phase error is then removed from the image spectra in a step similar to step 710 above.

The algorithm described above was implemented on PC workstation in both Matlab and c language. Tests have been performed using simulated complex images with injected phase error as well as tests using real GPR image data, which indicate that this method is a viable solution to the GPR autofocus problems described above.

Figure 8:
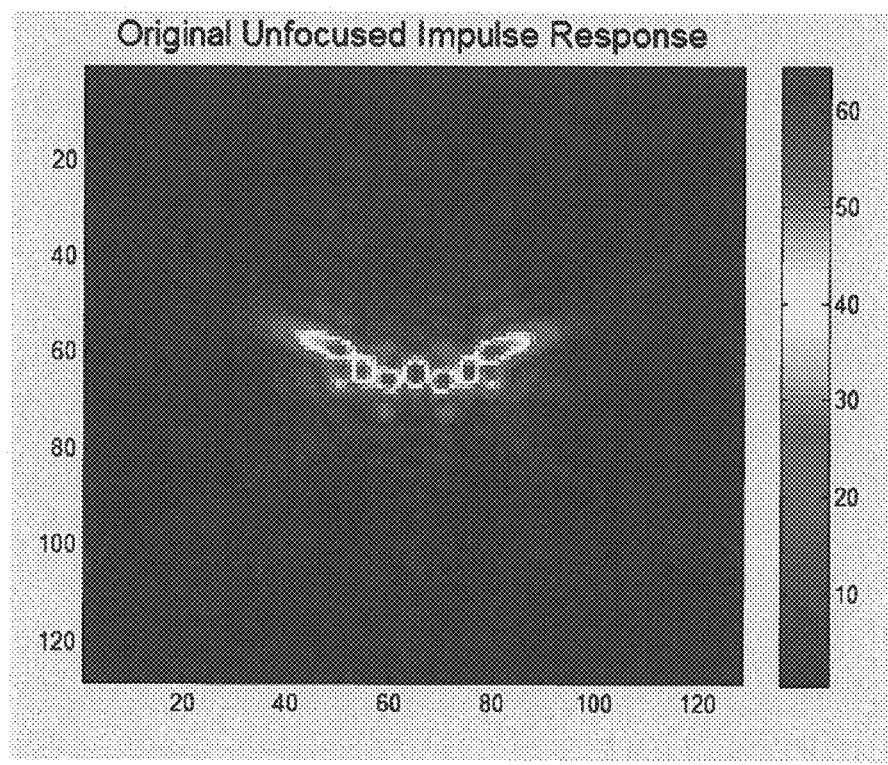
FIG. 8 shows an original unfocused impulse response for a simulated point target with a first injected phase error.
Figure 9:
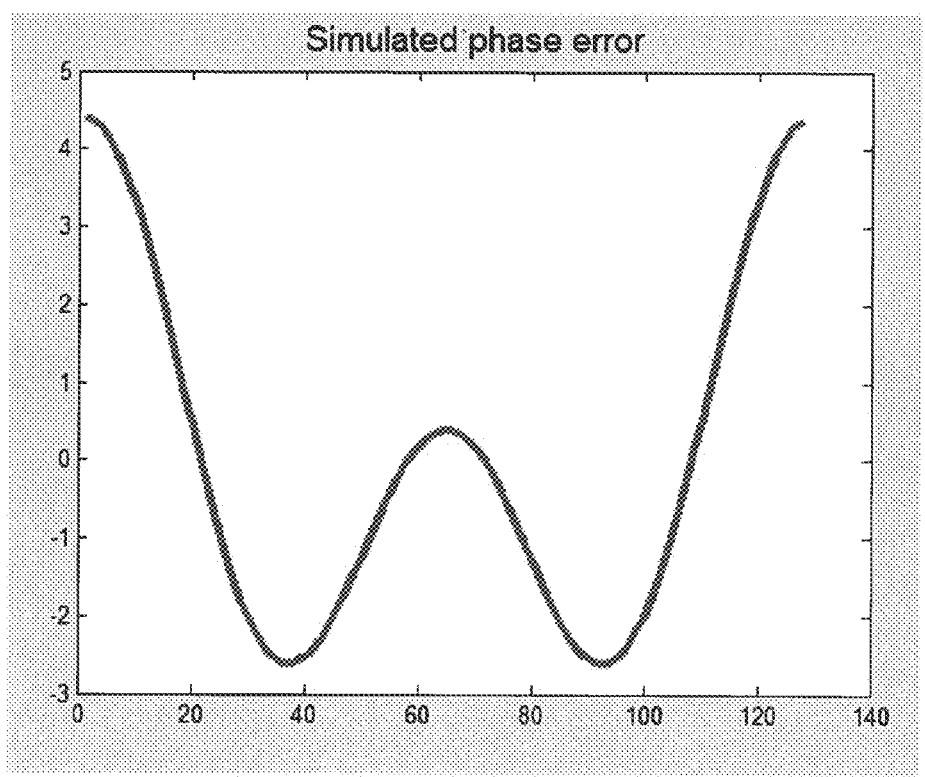
FIG. 9 shows a simulated phase error for the target of FIG. 8.
Figure 10:
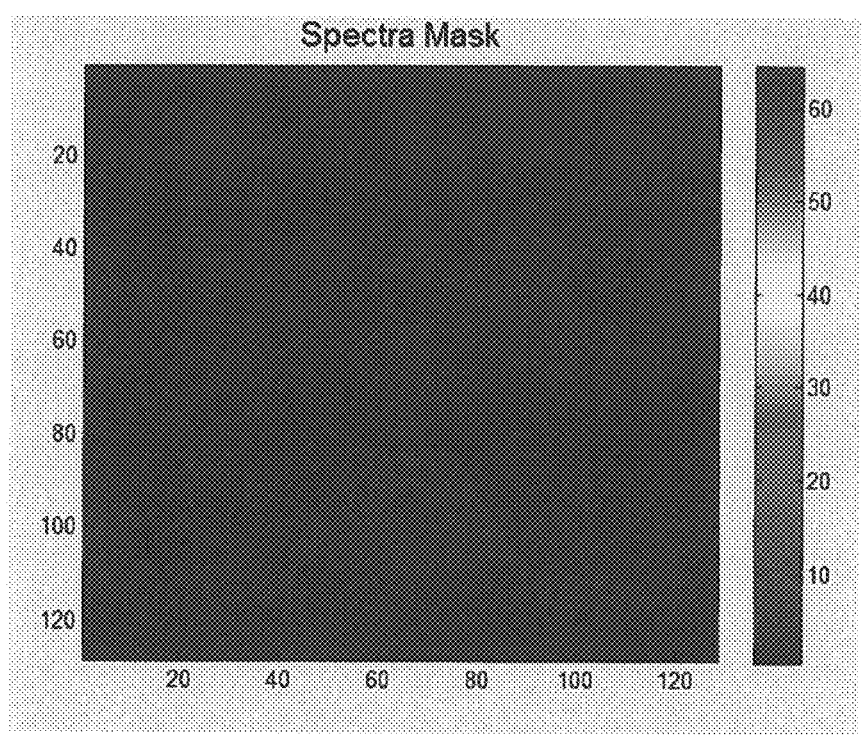
FIG. 10 shows a spectra mask for the target of FIG. 8.

FIG. 8 shows an original unfocused impulse response for a simulated unfocused point target with an injected phase error, FIG. 9 shows a simulated phase error for the target of FIG. 8, and FIG. 10 shows a spectra mask for the target of FIG. 8. FIG. 8 shows the simulated point target ground image with an injected phase error spreading over an area shown as the spectra mask. The target is out of focus with multiple bright dots.

Figure 11:
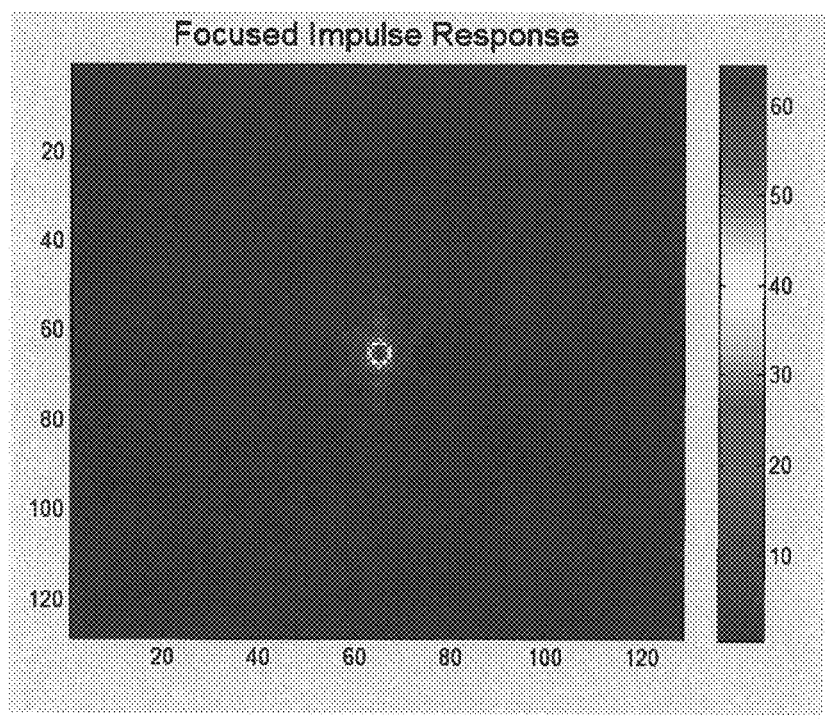
FIG. 11 shows a focused impulse response for the target of FIG. 8 after a method of autofocus according to an embodiment of the present invention.
Figure 12:
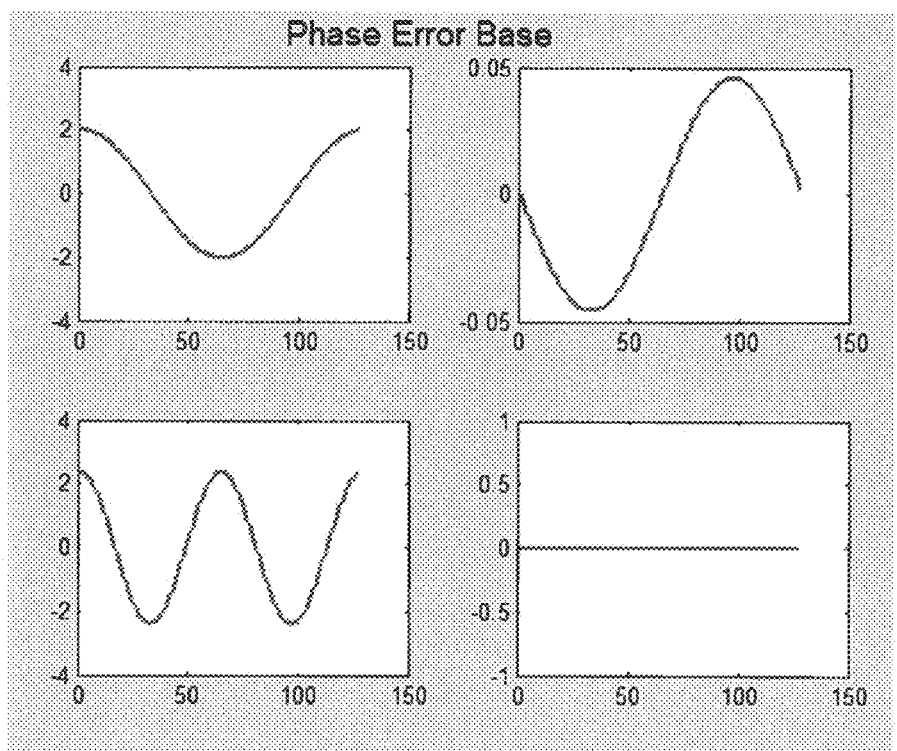
FIG. 12 shows a phase error base function for the target of FIG. 8 resultant from a method of autofocus according to an embodiment of the present invention.
Figure 13:
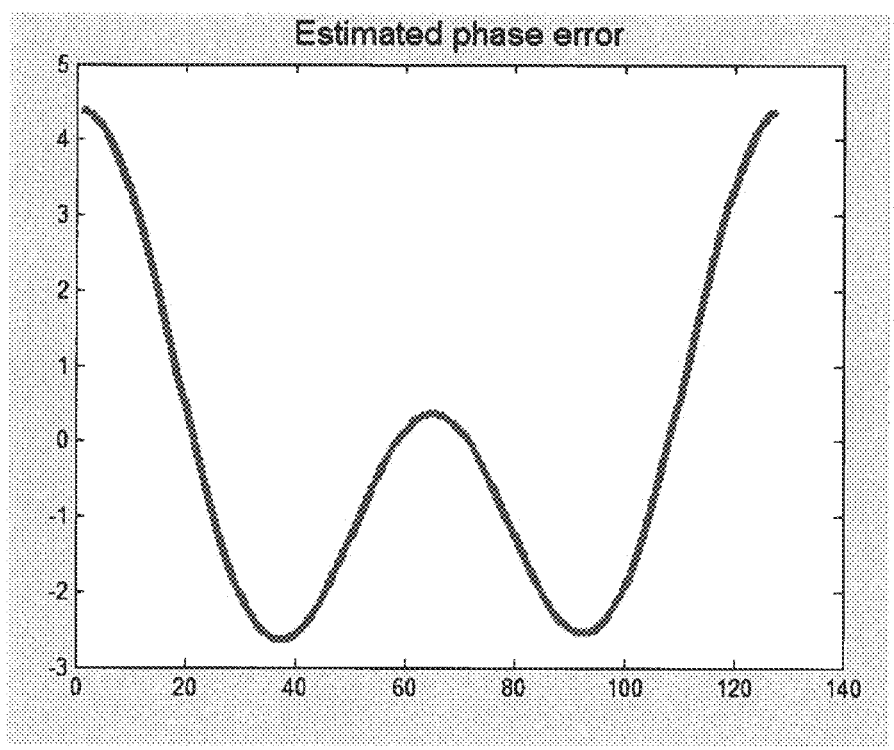
FIG. 13 shows an estimated phase error for the target of FIG. 8 resultant from a method of autofocus according to an embodiment of the present invention.

FIG. 11 shows a focused impulse response for the target of FIG. 8 after a method of autofocus according to an embodiment of the present invention, FIG. 12 shows a phase error base function for the target of FIG. 8 resultant from the method, and FIG. 13 shows an estimated phase error for the target of FIG. 8 resultant from the method. The unfocused target is refocused into a single dot with very little sidelobes. The estimated phase error is substantially identical to the injected phase error.

Figure 14:
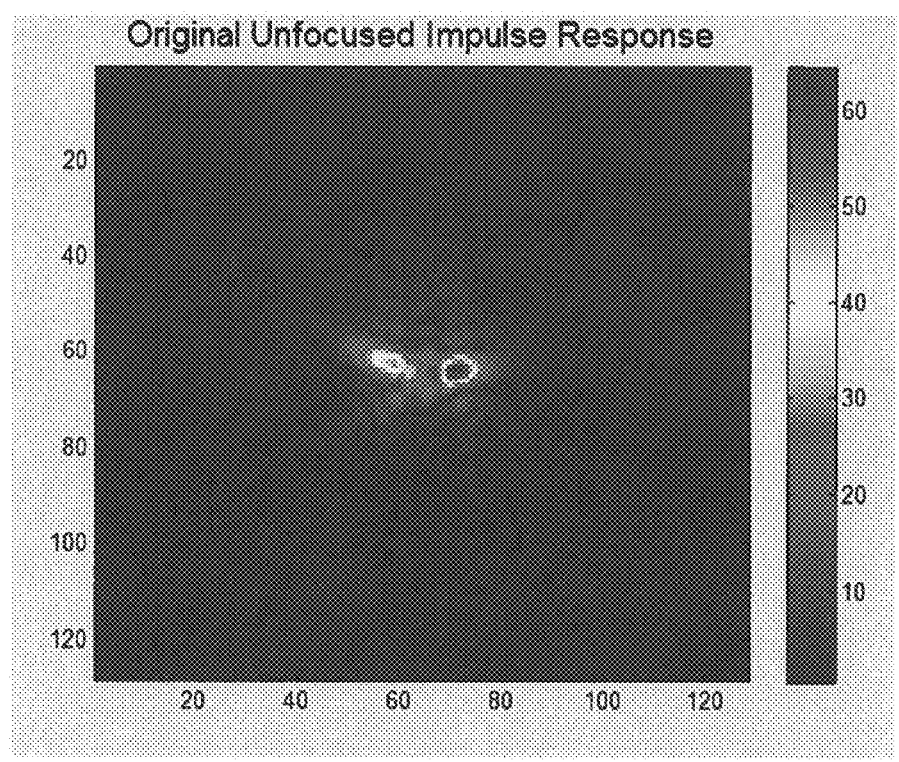
FIG. 14 shows an original unfocused impulse response for a simulated unfocused point target with a second injected phase error.
Figure 15:
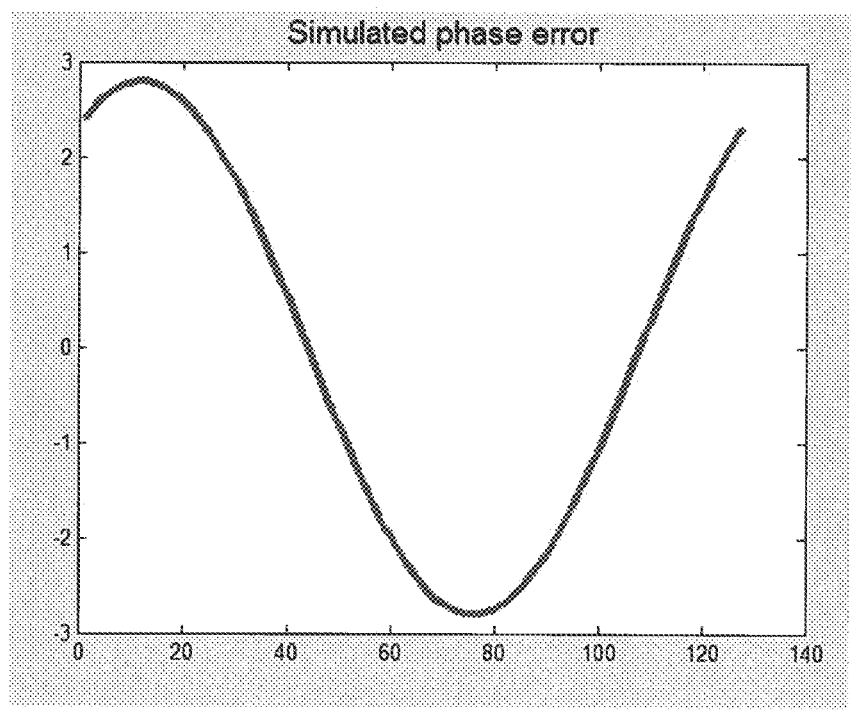
FIG. 15 shows a simulated phase error for the target of FIG. 14.
Figure 16:
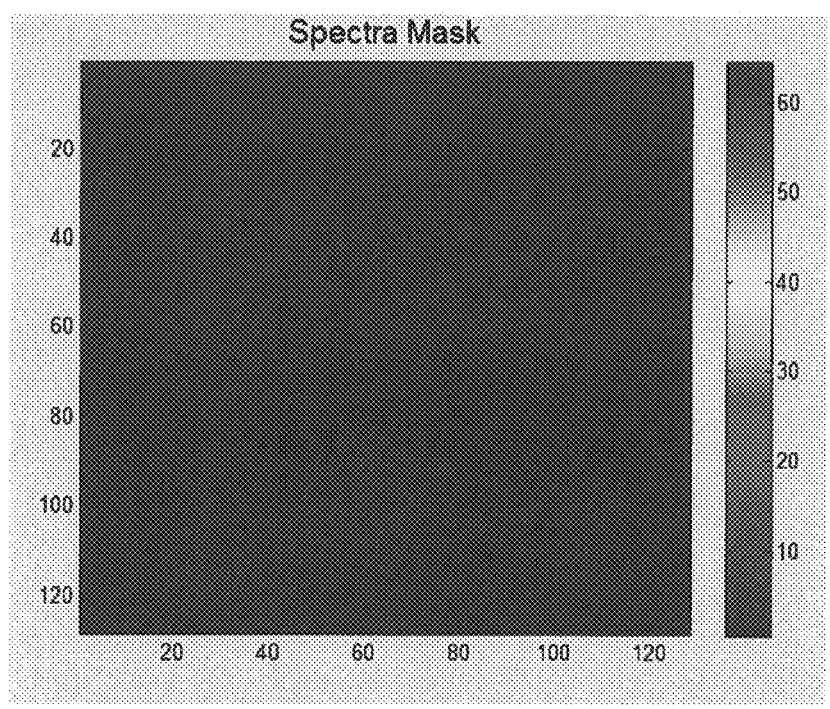
FIG. 16 shows a spectra mask for the target of FIG. 14.
Figure 17:
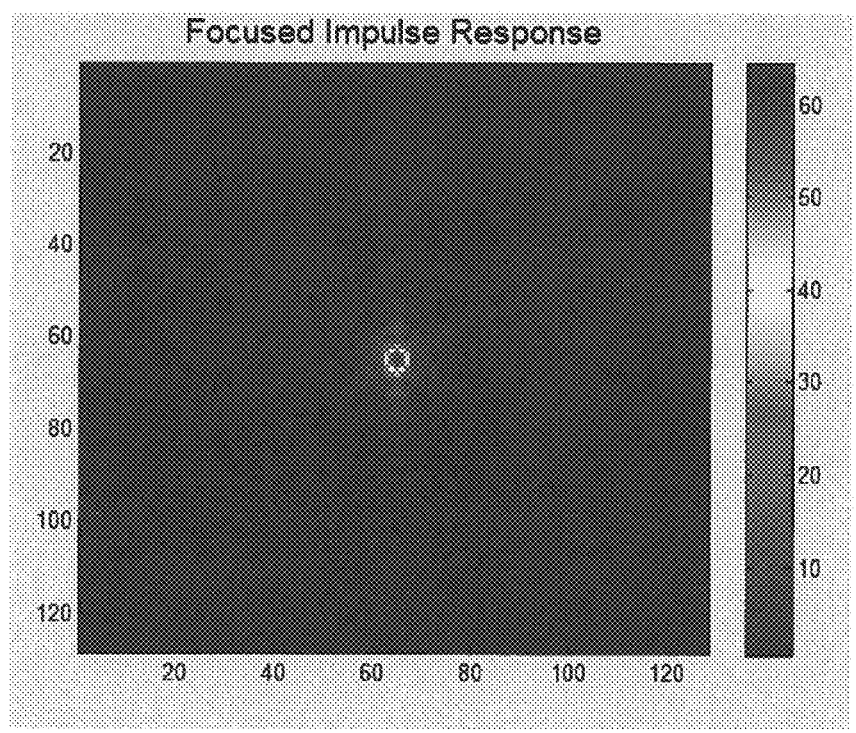
FIG. 17 shows a focused impulse response for the target of FIG. 14 after a method of autofocus according to an embodiment of the present invention.
Figure 18:
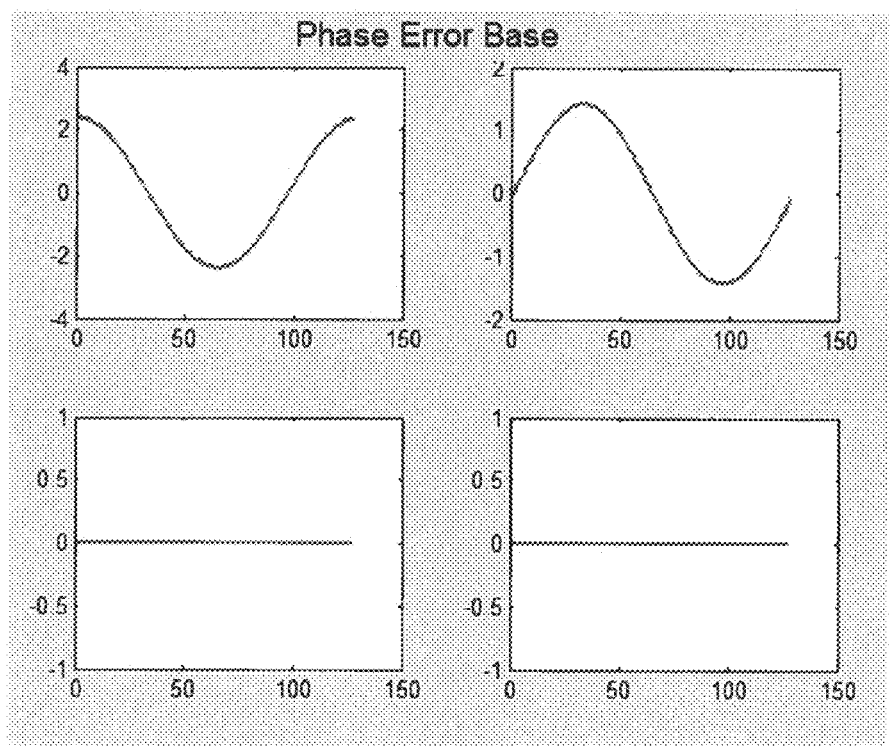
FIG. 18 shows a phase error base function for the target of FIG. 14 resultant from a method of autofocus according to an embodiment of the present invention.
Figure 19:
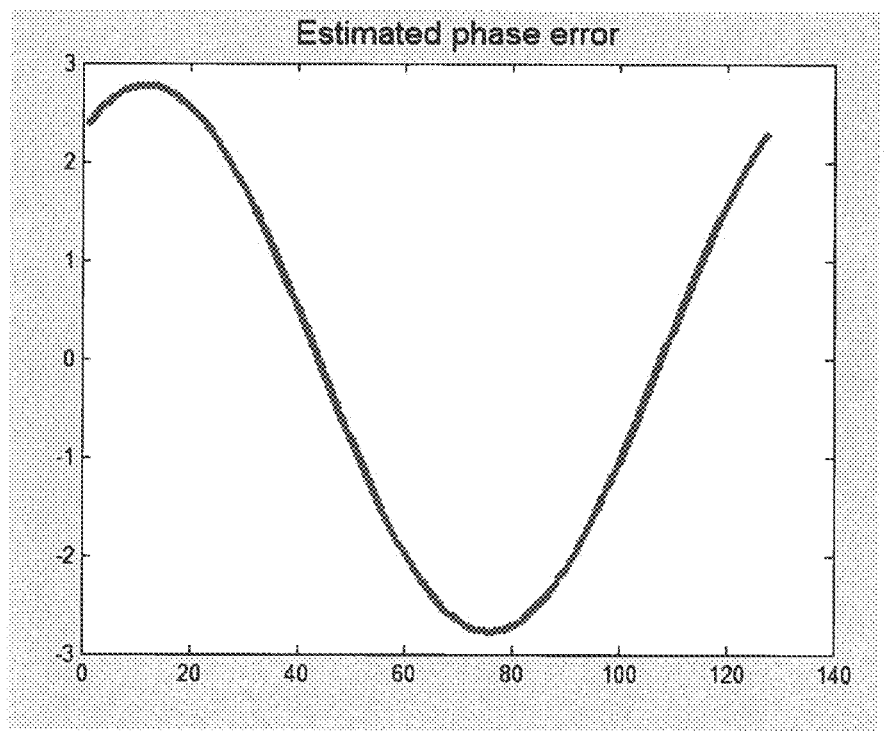
FIG. 19 shows an estimated phase error for the target of FIG. 14 resultant from a method of autofocus according to an embodiment of the present invention.

A second example with a different injected phase error is shown in FIGS. 14 to 19. FIG. 14 shows an original unfocused impulse response for a simulated unfocused point target with a second injected phase error, FIG. 15 shows a simulated phase error for the target of FIG. 14, and FIG. 16 shows a spectra mask for the target of FIG. 14. FIG. 17 shows a focused impulse response for the target of FIG. 14 after a method of autofocus according to an embodiment of the present invention, FIG. 18 shows a phase error base function for the target of FIG. 14 resultant from the method, and FIG. 19 shows an estimated phase error for the target of FIG. 14 resultant from the method. Here, the unfocused target is refocused into a single dot with small sidelobes. The estimated phase error is substantially identical to the injected phase error.

Real GPR images have also been successfully tested with the proposed autofocus algorithm. FIG. 20*a* shows an unfocused GPR image with corner reflectors, where the system has a wide frequency band from 1.0 GHz to 1.8 GHz, FIG. 20*b* shows an enlarged area I of FIG. 20*a*, and FIG. 20*c* shows an example of a focused impulse response of the image of FIG. 20*a* according to an embodiment of the present invention. The impulse response of the corner reflector in the original image is smeared with relatively poor resolution in azimuth. A small image block with nine corner reflectors is tested with the autofocus method. Here, the refocused corner reflectors all become much sharper impulse responses with 3 dB resolution consistent with the predicted value and improved sidelobe ratio.

Other tests were also successful for other GPR images with different bandwidth ranges and other types of scenes with or without man-made targets.

Embodiments of the present invention provide an accurate and effective autofocus method for the ground penetration radar. By applying autofocus independently over each image block, the spatially varying phase in a wide beam GPR is overcome. An accurate phase error model is formed by the mapping between the target slant range errors over time to the 2D phase error over polar angle in the spectra domain. Accurate phase error is estimated by using the image contrast optimization over each phase error component within a Fourier series of limited order.

Although the present invention has been described and illustrated in respect to exemplary embodiments, it is to be understood that it is not to be so limited, and changes and modifications may be made therein which are within the full intended scope of this invention as hereinafter claimed.

What is claimed is:

1. A method of synthetic aperture radar autofocus for ground penetration radar, the method comprising:
   transmitting a signal via an antenna;
   receiving a reflected signal comprising an image via the antenna;
   dividing the image into a plurality of image blocks, each image block to be refocused separately;
   reading each image block from the image via a processor;
   locating prominent targets in each image block via the processor;
   estimating ground penetration phase error via the processor in each image block according to a fourier series model and based on pulling range and quantization level of the phase error by generating a 1D phase error and converting the 1D phase error into a 2D phase error of an image spectra for each image block and within the pulling range;
   refocusing each image block according to estimated ground penetration phase error for that image block by the processor; and
   forming an image mosaic comprising each refocused image block via the processor.

2. The method of claim 1, wherein the estimating ground penetration phase error further comprises:
   selecting a base function for representing the phase error via the processor;
   assigning a phase error magnitude via the processor;
   generating the 1D phase error from the assigned phase error magnitude and the base function via the processor;
   generating a 2D image spectra via a 2D fast fourier transform of each image block via the processor;
   mixing the 2D phase error over the 2D image spectra via the processor;
   performing an inverse 2D fast fourier transform over the phase error mixed spectra to determine an image domain via the processor;

determining phase error among multiple phase error magnitudes and multiple image blocks based on maximum image contrast via the processor;
determining a total phase error based on phase error components via the processor; and
removing the total phase error from the image spectra via the processor.

3. A system for synthetic aperture radar autofocus for ground penetration radar, the system comprising:
an antenna for transmitting a signal and for receiving a reflected signal comprising an image; and
a processor programmed to:
divide the image into a plurality of image blocks, each image block to be refocused separately
read each image block from the reflected signal;
locate prominent targets in each image block;
estimate ground penetration phase error in each image block according to phase error inputs comprising pulling range and quantization level by generating a 1D phase error and converting the 1D phase error into a 2D phase error of an image spectra for each image block and within the pulling range;
refocus each image block according to estimated ground penetration phase error for that image block; and
form an image mosaic comprising each refocused image block.

4. The system of claim 3, wherein the processor is further programmed to estimate ground penetration phase error by:
selecting a base function for representing the phase error;
assigning a phase error magnitude;
generating the 1D phase error from the assigned phase error magnitude and the base function;
generating a 2D image spectra via a 2D fast fourier transform of each image block;
mixing the 2D phase error over the 2D image spectra;
performing an inverse 2D fast fourier transform over the phase error mixed spectra to determine an image domain;
determining phase error among multiple phase error magnitudes and multiple image blocks based on maximum image contrast;
determining a total phase error based on phase error components; and removing the total phase error from the image spectra.

* * * * *